(12) United States Patent
Wolf et al.

(10) Patent No.: US 7,982,685 B2
(45) Date of Patent: *Jul. 19, 2011

(54) RADOME

(75) Inventors: Edward Wolf, Dayton, OH (US); Chris Richardson, Christchurch (NZ)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,377

(22) Filed: Sep. 7, 2010

(65) Prior Publication Data

US 2010/0328172 A1 Dec. 30, 2010

Related U.S. Application Data

(63) Continuation of application No. 11/672,126, filed on Feb. 7, 2007, now Pat. No. 7,812,782.

(51) Int. Cl.
*H01Q 1/42* (2006.01)
(52) U.S. Cl. ......................... 343/872; 343/721
(58) Field of Classification Search .................. 343/872, 343/721
See application file for complete search history.

(56) References Cited

U.S. PATENT DOCUMENTS

| | | |
|---|---|---|
| 5,760,909 A | 6/1998 | Nichols |
| 6,462,717 B1 | 10/2002 | Wheelock et al. |
| 6,727,849 B1 | 4/2004 | Kirk et al. |
| 7,139,662 B2 | 11/2006 | Ericsson et al. |
| 2005/0131640 A1 | 6/2005 | Price et al. |
| 2006/0187113 A1 | 8/2006 | Korte, Jr. |
| 2006/0201007 A1 | 9/2006 | Piekutowski |

OTHER PUBLICATIONS

Trimble Construction Division, "Trimble MT900 Machine Target", Trimble Construction Product Specs, Jul. 9, 2007, pp. 1.
Trimble Construction Division, "Trimble MS990 Smart GPS+GLONASS Antenna", Trimble Construction Product Specs, Jul. 2007, pp. 1-3.
Trimble Navigation Limited, "Trimble SPS730 and SPS930 Universal Total Stations", Datasheet, 2007.
International Search Report and Written Opinion for International application No. PCT/US2008/053266 dated Jun. 26, 2008.

*Primary Examiner* — Douglas W Owens
*Assistant Examiner* — Dieu T Duong
(74) *Attorney, Agent, or Firm* — Dinsmore & Shohl LLP

(57) ABSTRACT

A GPS reception arrangement includes a GPS radome body having an upper body portion, a lower body portion and a peripheral body portion between the upper body portion and the lower body portion and extending circumferentially there around, and a GPS antenna positioned inside the radome body. A plurality of light sources on the peripheral body portion of the radome body project light in a manner to identify the GPS radome, and distinguish it from other radomes. Retroreflective material is positioned around the radome body on the peripheral body portion, adjacent the plurality of light sources.

11 Claims, 4 Drawing Sheets

RADOME

CROSS-REFERENCE TO RELATED APPLICATIONS

This is a continuation of U.S. patent application Ser. No. 11/672,126, filed Feb. 7, 2007 now U.S. Pat. No. 7,812,782.

STATEMENT REGARDING FEDERALLY SPONSORED RESEARCH OR DEVELOPMENT

BACKGROUND OF THE INVENTION

In recent years, total station devices have gained popularity for both surveying and machine control applications. A total station is an optical instrument that is capable of sighting a target and determining the azimuth and ordinate angles from the total station to the target, and also the distance from the total station to the target. The distance is determined by directing a beam of laser light at the target, sensing the reflected light returning from the target, and determining the time of flight of the beam. Since the relative orientation and distance of the target from the total station are then known, and since the precise location of the total station will have already been determined with conventional surveying techniques, the location of the target is therefore determined.

Robotic total stations have been developed that track a target continuously, without the need for an operator. Servo motors in the robotic total station cause it to rotate toward the target, providing precise angular and distance measurements. Typically, the target will be carried by a surveyor or by an earthmoving machine, driven by an operator. The robotic total station continuously transmits the data defining the position of the target to a computer system that may be carried by the surveyor, located on the earthmoving machine, or located at a remote location, thus providing real time position data for the target. Robotic total stations may provide position information for machine control, communicating the information for comparison to the job plan.

The robotic total station tracks and measures the position of the moving target remotely, continuously sending the measured data to the controlling computer. Robotic operation of a total station can be combined with real time kinematic measurements made by GPS receiver system to enhance the overall accuracy and versatility of the system. Such a system contemplates a GPS antenna being carried with the total station target so that position data can be collected through both the total station system and the GPS system. Other information may also be provided and combined to determine the position of the target or antenna. For example, location information, such as that developed by other sensors, such as laser scanners, echo beams, or atmospheric condition sensors, may also be used to enhance the accuracy of the system.

While such systems are advantageous, a need exists for a system which is capable of tracking one or more targets at a construction site where there may be multiple targets on various pieces of equipment at the site, and which permits GPS position data and total station position data to be combined readily. It is typical to provide a GPS guidance system for construction equipment. Although it is very accurate in operation, such a GPS guidance system does not operate well, or ceases to operate at all, when one or more of the GPS satellites upon which it bases location calculations becomes obscured from the view of the GPS satellite antenna. There are situations at a construction or mining site when there is either poor GPS coverage or GPS shading occurs, for example as a result of working adjacent to high walls or working under a bridge or overpass. If this should occur, the construction equipment can be left without needed position data for an extended period, significantly reducing productivity as the operator of the machine is forced to operate using alternative position determination equipment, such as an inertial reference unit. Clearly this is undesirable due to the added equipment cost.

SUMMARY OF THE INVENTION

These needs are met and the difficulties encountered in the prior art are overcome by a GPS reception arrangement, constructed according to the present invention, including a GPS radome and a GPS antenna. The GPS radome includes a GPS radome body having an upper body portion, a lower body portion and a peripheral body portion between the upper body portion and the lower body portion. The peripheral body portion extends circumferentially around the GPS radome body. The GPS antenna is positioned inside the radome body. A plurality of light sources are positioned on the peripheral body portion of the radome body for projecting light in a manner to identify the GPS radome. Retroreflective material is positioned around the radome body on the peripheral body portion, adjacent the plurality of light sources. A power and control source supplies power to said light sources such that said light sources are illuminated in a recognizable pattern that distinguishes said GPS radome from other GPS radomes.

The retroreflective material may comprise at least one strip of retroreflective material extending around the radome body on the peripheral body portion adjacent the plurality of light sources. The at least one strip of retroreflective material may comprise a pair of strips of retroreflective material extending around the radome body adjacent the plurality of light sources on the peripheral body portion. One of the pair of strips is positioned above the plurality of light sources and the other of the pair of strips is positioned below the plurality of light sources.

The GPS radome body may be generally cylindrical in shape. The plurality of light sources may comprise a plurality of light emitting diodes spaced around the peripheral body portion of the radome body. The GPS reception arrangement may include a mast engaging bracket in the lower body portion for securing the radome to a support mast.

Accordingly, it is an object of the present invention to provide an improved GPS radome; to provide a GPS radome that is also configured to act as a trackable target for a robotic total station; and to provide an improved GPS radome that signals its identity to any robotic total station that may be tracking the radome.

DETAILED DESCRIPTION OF THE PREFERRED EMBODIMENTS

Figure 1:
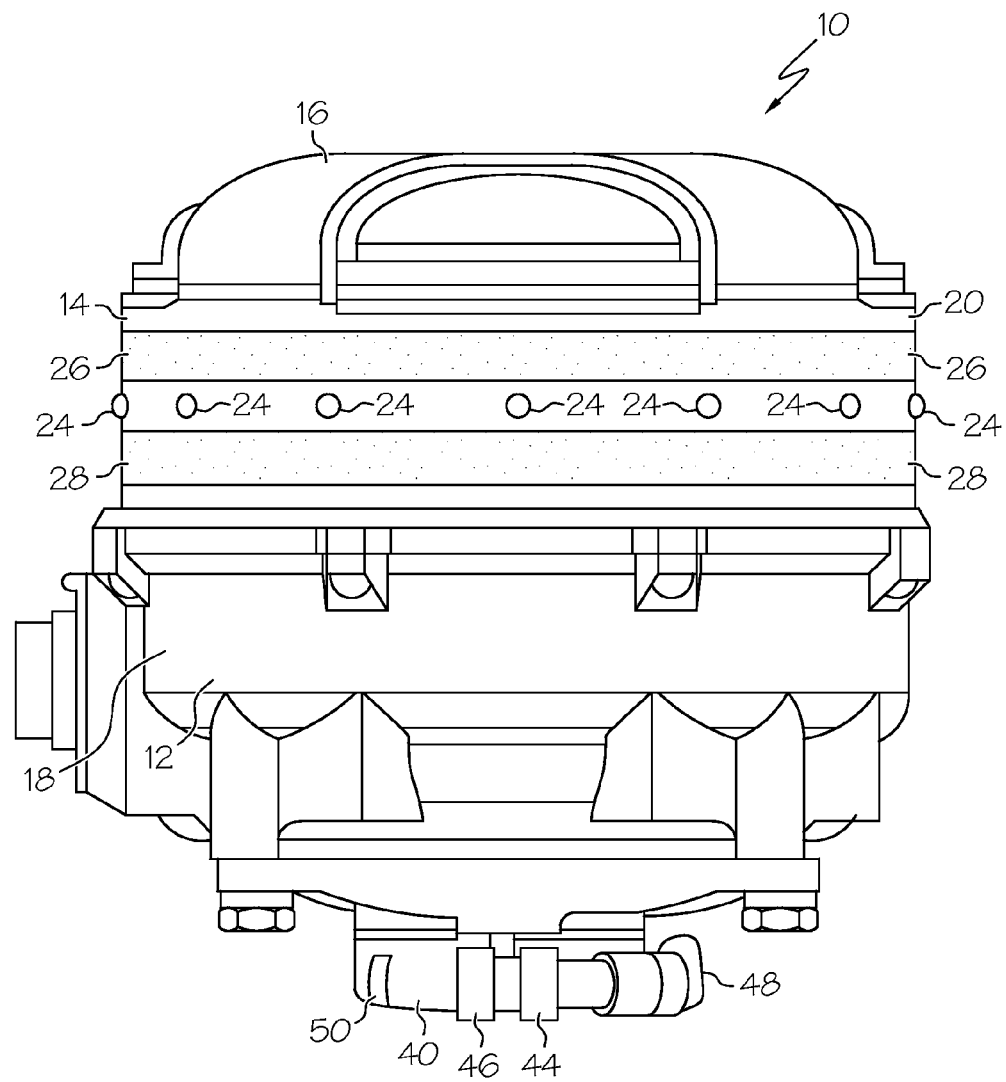
FIG. 1 is a side view of the GPS radome of the present invention.
Figure 2:
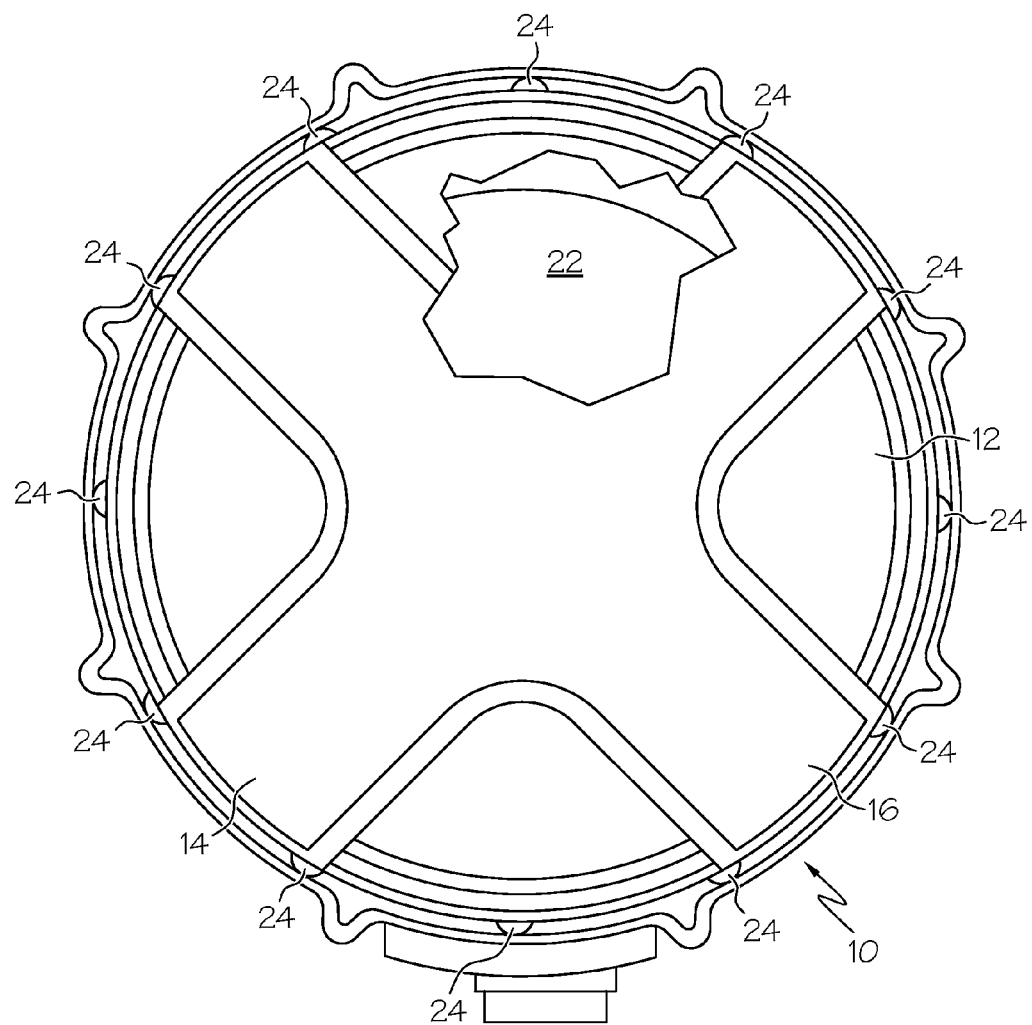
FIG. 2 is a top view of the GPS radome of the present invention with a portion broken away to reveal the GPS antenna inside the radome.
Figure 3:
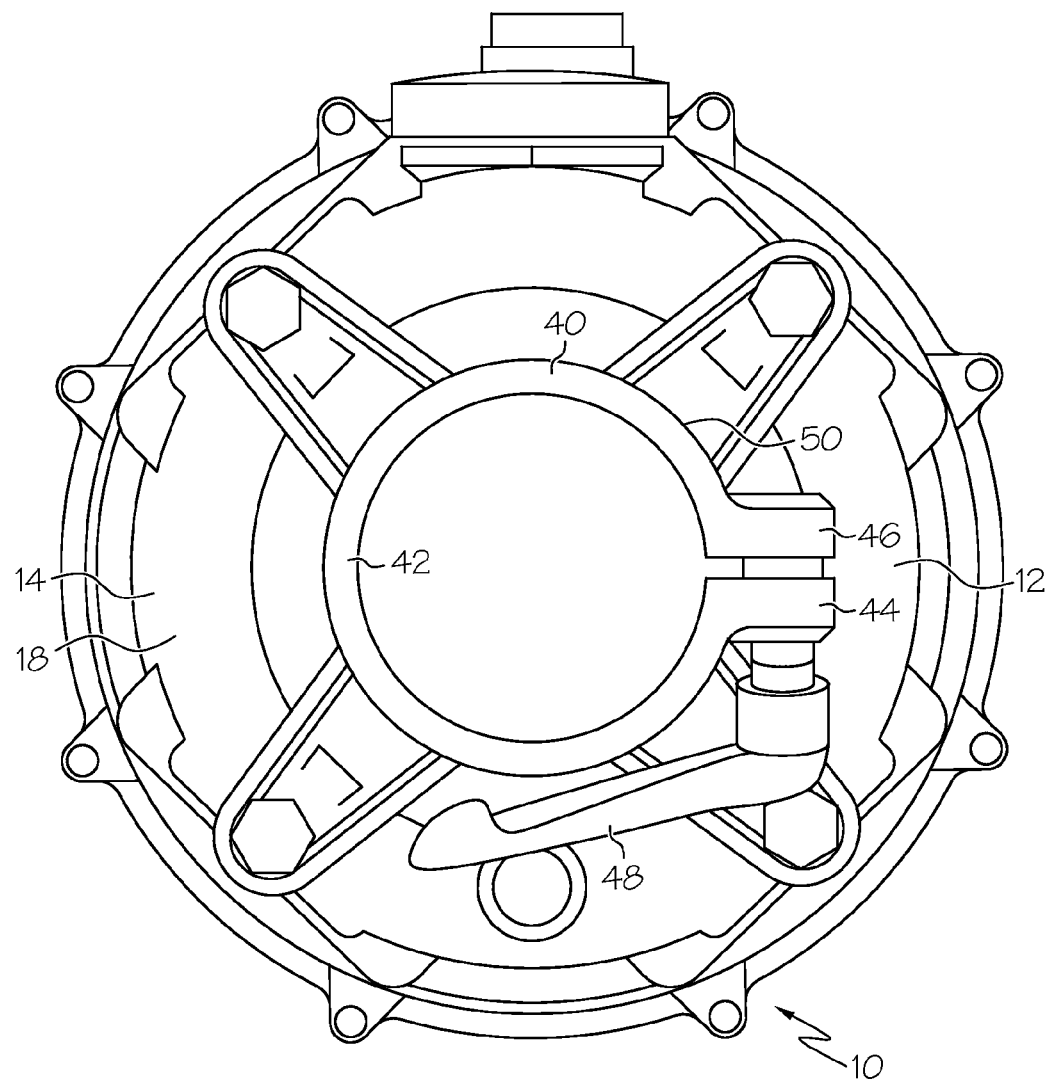
FIG. 3 is a bottom view of the GPS radome of the present invention.

Reference is made to FIGS. 1-3 which show a GPS reception arrangement 10, including a GPS radome 12 constructed according to the present invention. The radome 12 includes a GPS radome body 14 having an upper portion 16, a lower body portion 18, and a peripheral body portion 20 between the upper body portion 16 and the lower body portion 18. The peripheral body portion 20 extends circumferentially around the radome body 14, and the GPS radome body 14 is generally cylindrical in shape.

As seen in FIG. 2, the GPS reception arrangement includes a GPS antenna 22 positioned inside the radome body 14. The GPS antenna 22 is connected to a GPS receiver (not shown) which may be position inside the radome 12 or, alternatively, positioned outside the radome 12 and connected to the antenna by a suitable connector cable.

The GPS reception arrangement further includes a plurality of light sources 24 that are mounted on the peripheral body portion 20 of the radome body 14 for projecting light in a manner to identify the GPS radome. The light sources may preferably comprise a plurality of light emitting diodes (LED's) that are spaced around the peripheral body portion 20 of the radome body 14. As described more fully, below, the light emitting diodes are typically illuminated in a recognizable pattern so that the radome 12 may be distinguished from other nearby radomes by a robotic total station that is using the radome as a target and tracking its position and movement.

The GPS reception arrangement further includes retroreflective material positioned around the radome body 14 on the peripheral body portion 20, adjacent the plurality of light sources 24. As shown in FIG. 1, the retroreflective material may comprise at least one strip of retroreflective material extending around the radome body 14 on the peripheral body portion 20 adjacent the plurality of light sources 24. More preferably, the at least one strip of retroreflective material comprises a pair of strips 26 and 28 of retroreflective material, such as retroreflective tape, extending around the radome body 14 adjacent the plurality of light sources 24 on the peripheral portion 20. One of the pair of strips of the retroreflective tape 26 is positioned above the plurality of light sources 24 and the other of the pair of strips of retroreflective tape 28 is positioned below the plurality of light sources 24. The retroreflective tape strips 26 and 28 permit a robotic total station monitoring the position of the radome 14 to make distance measurements by directing a beam of laser light at the radome and measuring the time required for the light to travel from the total station to the radome 14 and then return to the total station.

Figure 4:
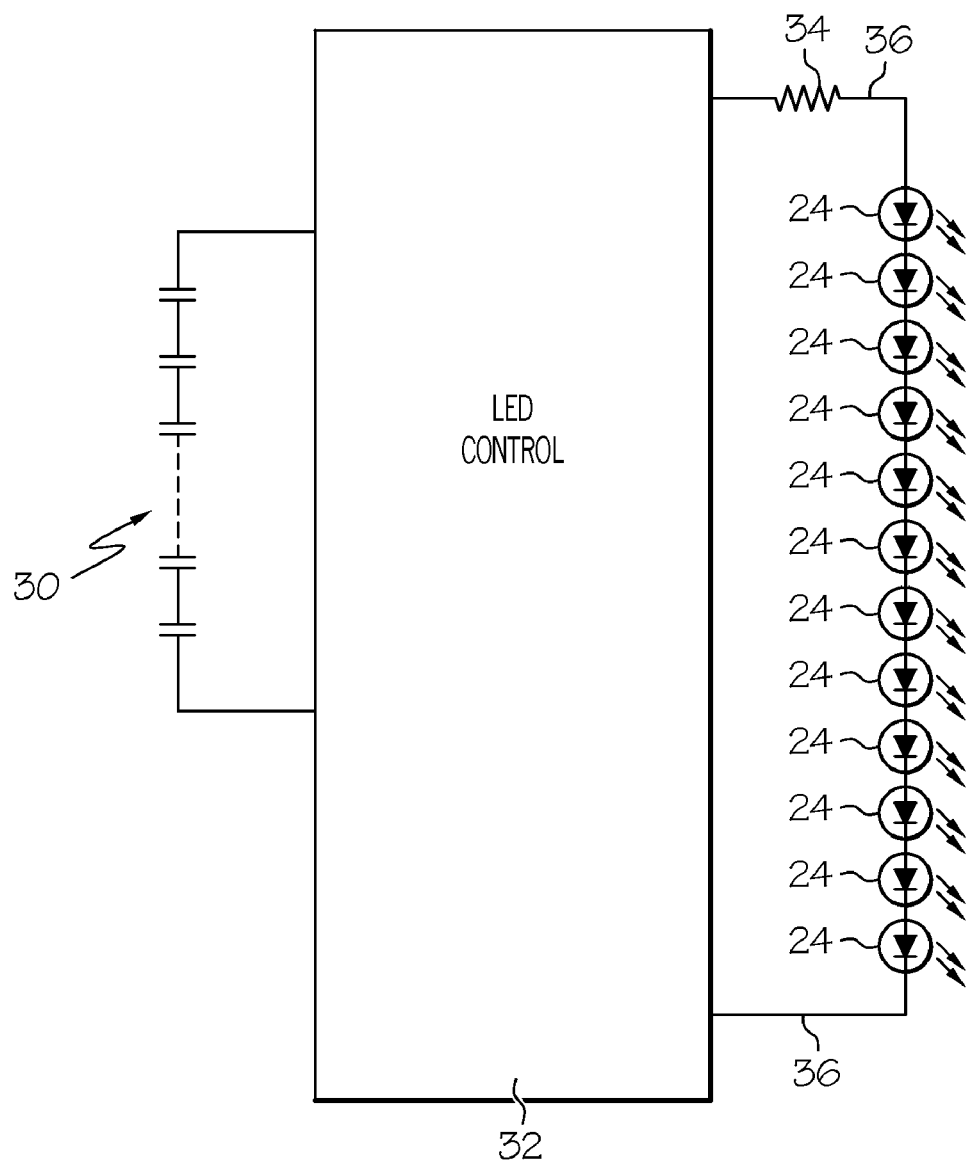
FIG. 4 is a schematic representation of the LED control circuit of the present invention.

Reference is made to FIG. 4, which is a schematic diagram illustrating a power and control source, comprising battery 30, and an LED control circuit 32. The light emitting diodes 24 are serially connected with a resistor 34 and battery 30 by the LED control circuit 32. LED control circuit 32 and the battery 30 supply power to the light sources 24 such that the light sources 24 are illuminated in a recognizable pattern. This recognizable pattern may, for example, be one in which the light sources 24 are simply repeatedly switched on and off at a predetermined frequency. Since the LED's 24 are connected serially, the control 32 may take the form of a simple switching circuit. If desired, however, the LED's may be switched on and off in an irregular pattern or, if wired for separate control, the LED's may be switched on and off individually in a more complex pattern. The LED control 32 and the battery 30 may be located inside the radome 14 or, alternatively, may be located outside the radome 14 and connected to the LED's via a connector cable 36. In any event, the flashing pattern from the LED's assists a robotic total station in distinguishing the radome 12 as a target from other radomes at a work site, and in monitoring the position and movement of the radome 12.

As seen in FIG. 3, the radome body 14 further includes a mast engaging bracket 40 having a split ring 42. The ring 42 may be tightened on a supporting mast (not shown) by rotating a threaded shaft that extends through ring ends 44 and 46 by rotating lever arm 48 attached to the shaft.

The mast engaging bracket 40 may further include an orientation element, such as index mark 50, that permits the radome to be secured to the support mast in a desired, defined orientation. When the radome is placed on the mast it is rotated until index mark 50 is aligned with a corresponding index mark on the mast. By this arrangement, the radome may always be oriented in the same way with respect to the mast and with respect to the machine from which carries the mast. Other orientation elements may be used in lieu of index mark 50. for example, the exterior of the mast and the interior of the bracket 40 may have interfitting grooves and ridges that only permit the bracket to be placed on the mast in one orientation.

Total stations have been used both for surveying and for machine control. In a typical surveying application, a total station, positioned at a known location, directs a beam of laser light to a target positioned by a surveyor at a point to be surveyed. The target includes retroreflectors which reflect the beam back to the total station. By measuring the time of flight of the beam, the distance between the total station and the target is determined. By also measuring the direction of the beam from the total station to the target, i.e., the altitude and azimuth angles that define a vector from the total station to the target, the location of the target is precisely determined.

The radome 12 of the present invention is designed to house and protect a GPS antenna, and perhaps a GPS receiver and electronics, as well, permitting the location of the radome 12 to be determined through known GPS measurement techniques. At the same time, the radome 12 of the present invention is designed to act as an identifiable, trackable target for a robotic total station, permitting the robotic total station to determine the radome position relative to the known position of the total station. The location information may then be transmitted via a radio link in a known manner to the same control system where the GPS location information is analyzed. The GPS derived location information and the total station derived location information may be combined to enhance the estimate of the position of the radome 12. The control system which analyzes and combines location information from the GPS system and the total station system may be located on a construction machine at a work site. Alternatively, the control system may be carried by a surveyor as the surveyor moves about a work site. Yet another possibility is that the control system may be remotely located from the work site and simply maintained in direct communication with the surveyor or the construction machine over a suitable channel.

The present invention facilitates the use of the radome 12 as a total station target by insuring that it be identified by the total station as the LED's 24 are actuated in a unique manner. For example, the LED's 24 of each of a number of radomes at a job site may be flashed at a different, unique frequency. Preferably, the LED's 24 will be actuated in unison so that the same flashing light pattern is projected from the radome in all directions. However, if desired, the LED's may be flashed in a non-uniform pattern or may be connected differently than is shown in FIG. 4 so that the light projected from one side of a radome will differ from the light projected from the opposite side of the radome.

The radome of the present invention permits a robotic total station to scan a work site where there are multiple GPS antenna radomes and find a particular machine radome by the specific blinking code emanating from its array of light emitting diodes. The machine may have previously transmitted an indication to the robotic total station that the machines GPS position system had lost satellite reception. The location of the radome and its antenna in relation to the robotic total station is then determined by time of flight and direction measurements made from the robotic total station to the retroreflective tape. The position data is then transmitted to the machine to allow the machine to continue its task with three dimensional position information from the total station during a period of time when position information from the GPS receiver is interrupted. When the GPS receiver begins receiving GPS satellite signals, the GPS position measurement system becomes operational, and the total station discontinues providing this information to the machine.

At many construction sites there are typically a number of machines operating under GPS control. Any of these machines may from time to time experience interruption of GPS reception and a resulting loss of continuous machine position information. By positioning a robotic total station at a known location at the construction site, the total station is available to provide position information temporarily to any of the machines. If the machines each carry at least one GPS radome constructed according to the present invention, the robotic total station can distinguish among the radomes and provide the position information of the machine experiencing GPS reception difficulties. Further, if needed, the total station may provide position information to a number of machines simultaneously by multiplexing among the machines rapidly, that is, by switching from machine to machine as the need arises. The machines that have impaired GPS reception may notify the total station by radio transmission, for example. The robotic total station is able to identify the one or more machines that have impaired GPS reception by their flashing LED codes, and then make rapid position determinations. For the total station to know where to search for a machine, the machine may transmit its last known coordinates via radio to the robotic total station at the time that it requests supplemental position information from the total station. The total station will then point in that general direction, sweep back and forth, find the reflective surface, and identify the blinking LED code to insure it has locked onto the correct machine. The robotic total station will provide position information to the machine to permit the machine to continue operation uninterrupted. By this arrangement, a single robotic total station can service multiple construction machines.

If the radome is properly oriented on the machine mast with respect to the mast and the machine, the LED's may be flashed in a manner that permits the total station to determine the orientation of the radome, and thus the orientation of the machine that carries the radome with respect to the total station.

While certain representative embodiments and details have been shown for purposes of illustrating the invention, it will be apparent to those skilled in the art that various changes in the invention disclosed herein may be made without departing from the scope of the invention, which is defined in the appended claims.

What is claimed is:

1. A GPS radome that can be distinguished from other radomes, comprising:
    a Global Positioning System (GPS) radome body having an upper body portion, a lower body portion and a peripheral body portion between said upper body portion and said lower body portion and extending circumferentially there around,
    a plurality of light sources on said peripheral body portion of said radome body and positioned therearound such that said light sources are visible on all sides of said body portion, for projecting light in a manner to identify the GPS radome,
    retroreflective material positioned around said radome body on said peripheral body portion, adjacent said plurality of light sources, and
    a power and control source for supplying power to said light sources such that said light sources are illuminated in a recognizable pattern that distinguishes said GPS radome from other GPS radomes.

2. The GPS radome of claim 1, in which said retroreflective material comprises at least one strip of retroreflective material extending around said radome body on said peripheral body portion adjacent said plurality of light sources.

3. The GPS radome of claim 2, in which said at least one strip of retroreflective material comprises a pair of strips of retroreflective material extending around said radome body adjacent said plurality of light sources on said peripheral body portion, one of said pair of strips positioned above said plurality of light sources and the other of said pair of strips positioned below said plurality of light sources.

4. The GPS radome of claim 1, in which said GPS radome body is generally cylindrical in shape.

5. The GPS radome of claim 1, further including a mast engaging bracket in the lower body portion for securing the radome to a support mast, said bracket including an orientation element such that the bracket may be used to secure the radome to the mast in a defined orientation.

6. A Global Positioning System (GPS) reception arrangement that can be distinguished from other GPS reception arrangements, comprising:
    a GPS radome body having an upper body portion, a lower body portion and a peripheral body portion between said upper body portion and said lower body portion and extending circumferentially there around,
    a GPS antenna positioned inside said radome body,
    a plurality of light sources on said peripheral body portion of said radome body and positioned therearound such that at least one or more of said light sources is visible from all directions, for projecting light in a manner to identify the GPS radome, retroreflective material positioned around said radome body on said peripheral body portion, adjacent said plurality of light sources, and
    a power and control source for supplying power to said light sources such that said light sources are illuminated in a recognizable pattern that distinguishes said GPS reception arrangement from other GPS reception arrangements.

7. The GPS reception arrangement of claim 6, in which said retroreflective material comprises at least one strip of retroreflective material extending around said radome body on said peripheral body portion adjacent said plurality of light sources.

8. The GPS reception arrangement of claim 6, in which said at least one strip of retroreflective material comprises a pair of strips of retroreflective material extending around said radome body adjacent said plurality of light sources on said peripheral body portion, one of said pair of strips positioned above said plurality of light sources and the other of said pair of strips positioned below said plurality of light sources.

9. The GPS reception arrangement of claim 6, in which said GPS radome body is generally cylindrical in shape.

10. The GPS reception arrangement of claim 6, in which said plurality of light sources comprise a plurality of light emitting diodes spaced around the peripheral body portion of said radome body.

11. The GPS radome of claim 6, further including a mast engaging bracket in the lower body portion for securing the radome to a support mast, said bracket including an orientation element such that the bracket may be used to secure the radome to the mast in a defined orientation.

* * * * *